US011764992B2

(12) United States Patent
Wright et al.

(10) Patent No.: US 11,764,992 B2
(45) Date of Patent: Sep. 19, 2023

(54) DEPLOYING APPLICATIONS ON HOME-NETWORK ROUTER

(71) Applicant: Charter Communications Operating, LLC, St. Louis, MO (US)

(72) Inventors: Ethan J. Wright, Denver, CO (US); Matthew J. Wright, Denver, CO (US); Micah W. Labbee, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/357,768

(22) Filed: Jun. 24, 2021

(65) Prior Publication Data

US 2022/0417053 A1    Dec. 29, 2022

(51) Int. Cl.
| | | |
|---|---|---|
| *H04L 12/28* | (2006.01) | |
| *H04L 12/46* | (2006.01) | |
| *H04L 9/40* | (2022.01) | |
| *H04L 61/4511* | (2022.01) | |
| *H04L 101/677* | (2022.01) | |

(52) U.S. Cl.
CPC ...... *H04L 12/2832* (2013.01); *H04L 12/2823* (2013.01); *H04L 12/4641* (2013.01); *H04L 61/4511* (2022.05); *H04L 63/0281* (2013.01); *H04L 2101/677* (2022.05)

(58) Field of Classification Search
CPC ............ H04L 12/2832; H04L 12/2823; H04L 12/4641; H04L 61/1511; H04L 61/6077; H04L 63/0281
See application file for complete search history.

(56) References Cited

U.S. PATENT DOCUMENTS

| | | |
|---|---|---|
| 9,712,486 B2 | 7/2017 | Johnson et al. |
| 10,230,798 B2 | 3/2019 | Doraiswamy et al. |
| 10,362,000 B2 | 7/2019 | Godfrey |
| 10,484,483 B1* | 11/2019 | Gupta ................. H04L 41/5054 |
| 10,555,176 B2 | 2/2020 | Idnani et al. |
| 2015/0052557 A1* | 2/2015 | Hjelmstedt ........ H04N 21/4334 725/39 |
| 2015/0333965 A1 | 11/2015 | Lee et al. |
| 2020/0092332 A1* | 3/2020 | Bhattathiri ............ H04L 63/107 |

* cited by examiner

*Primary Examiner* — Hua Fan
(74) *Attorney, Agent, or Firm* — THE MARBURY LAW GROUP, PLLC

(57) ABSTRACT

Various embodiments describe methods, systems, and devices for deploying an application associated with a user-selected container on a home-network router. Exemplary implementations may include receiving, at the home-network router from a remote server, container acquisition data including configuration information and rules for downloading the user-selected container. Also, initiating, by the home-network router, operation of application logic of the user-selected container in response to downloading the user-selected container from a remote container registry. Further, updating, by the home-network router, a reverse proxy maintained in the home-network router through application logic, wherein the reverse proxy is configured to forward requests from operation of the user-selected container to one or more remote servers; transmitting, from the home-network router to a remote computing device, a notification that the application associated with the user-selected container is deployed.

30 Claims, 7 Drawing Sheets

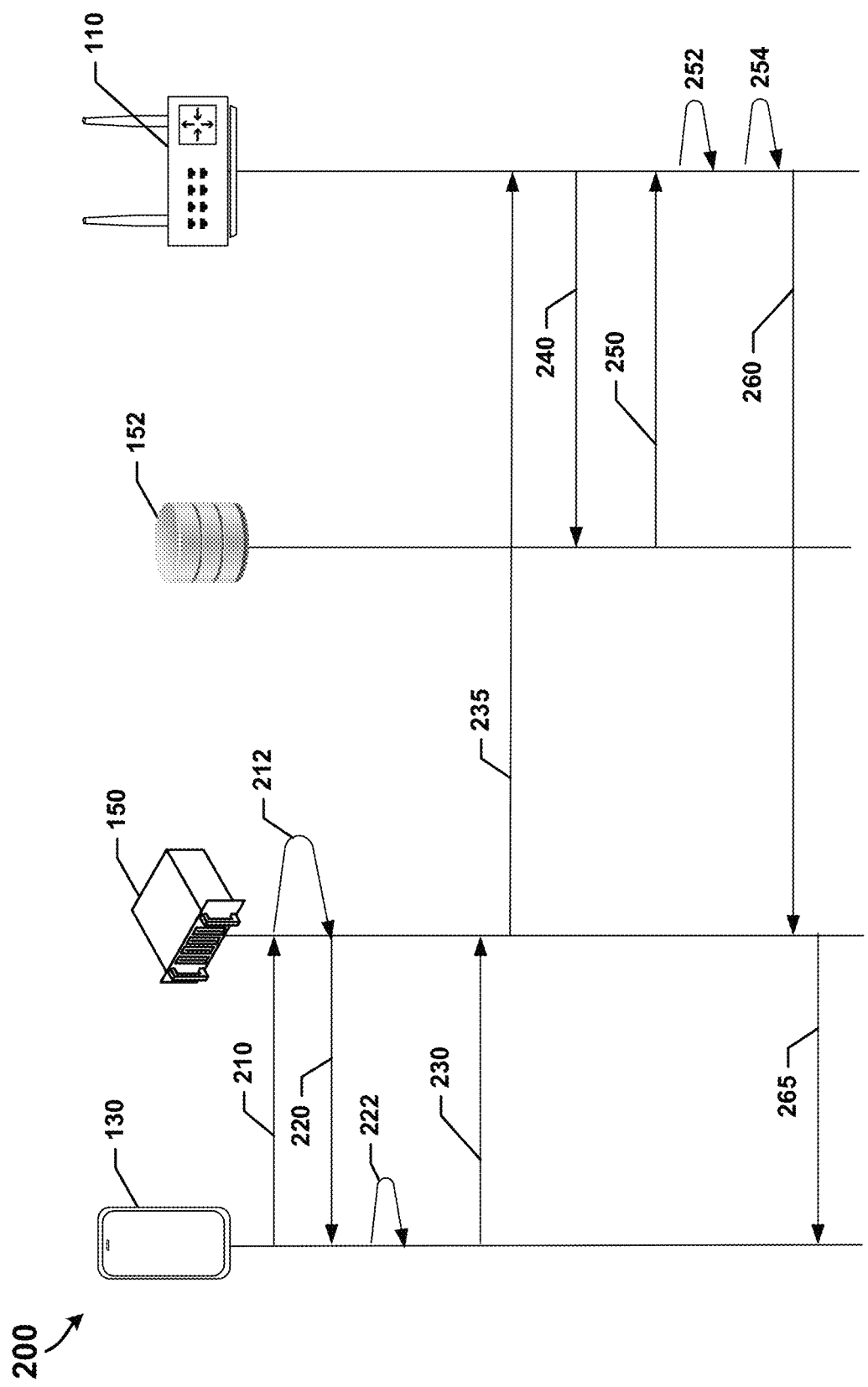

DEPLOYING APPLICATIONS ON HOME-NETWORK ROUTER

BACKGROUND

Many conventional homes have a range of Internet-connected computing devices—personal computers, tablets, smartphones, printers, thermostats, smart TVs, and more (i.e., Internet-of-Things (IoT) devices). A home-network router unites these devices to form a home-network by directing communications between those computing devices. Additionally, many home-network routers include or work in conjunction with a modem, which enables communications via the Internet. In this way, the home-network router may direct incoming and outgoing Internet traffic on the home-network. The information exchanged on home-networks may include emails, streaming multimedia content, or live feeds from a camera, each of which takes up varying amounts of bandwidth. As users add more and more devices to their home-networks, the demand on the home-network router increases.

Additionally, a pattern has emerged as inexpensive mini-computers (e.g., raspberry pi) have become readily available and software bundles/applications (hereinafter referred to as "App(s)") have been developed that are specifically designed to be loaded onto those mini-computers. In instances in which these mini-computer are configured with an App and plugged into a home-network router, these mini-computer may provide added functionality to IoT devices through the App. Since the mini-computers are configured to interact with the IoT devices on the home-network, the App may setup a reverse web proxy that allows users to navigate to a website from their local network, via the home-network router, run/interact with a select App, and control those IoT.

This has led to the development of a class of home-network Apps specifically designed to run on home-networks and control IoT devices on that network. Unlike Apps running on a mobile device, home-network Apps may be configured to run all the time and operate with or without the presence, assistance, and/or input of a mobile computing device. Also, many of these home-network Apps are not limited to controlling devices from a particular manufacturer. Rather, these home-network Apps can control home-network devices, regardless of their manufacturer. Another benefit of home-network Apps is that they do not need to be loaded onto all mobile devices that might want access to the home-network Apps, but still enable control by any of those devices through a web portal. Examples of some home-network Apps include:

Pi-hole, which allows domain name system (DNS) blocking;
Hass.io, which is like home assistant application that allow you to run IOT rules for different devices on your local network; and
Homebridge, which allows you to link extra IoT devices to the home kit ecosystem.

Home-network Apps generally provide for the setup of a local webpage, local routing rules, and provide an interface through a webpage that is exposed by the home-network App. For example, by loading an App onto a mini-computer (i.e., downloading application logic and configuration setting onto the raspberry pi) and plugging the mini-computer into the local network (e.g., directly into a home-network router), the App will run on the home-network through the home-network router. Currently, Apps get loaded onto the mini-computer or other computer, which gets connected to the home-network router that in-turn starts advertising itself as a device that can host a web server that has application logic. Often router settings or options must be changed manually in order to enable such functionality.

A drawback of such systems is that they require expert knowledge or technical expertise of computers and the associated hardware in order to set them up and get them to work correctly. Also, additional hardware, such as a mini-computer or other additional computing device, is required because the software on home-network routers is not readily or easily modified, which means such home-network Apps must be run off an additional computing device. Thus, some hardware (i.e., a computer) must be connected to a user's home-network router for home-network-based applications to work. In addition, some expertise is required to load software onto a mini-computer or other computing device for connecting it to the home-network router in order to get a home-network App to run.

SUMMARY

Various aspects include methods for deploying an application associated with a user-selected container on a home-network route. One aspect of the present disclosure includes receiving, at the home-network router from a remote server, container acquisition data including configuration information and rules for downloading the user-selected container. Also, the method may include initiating, by the home-network router, operation of application logic of the user-selected container in response to downloading the user-selected container from a remote container registry. Further, the method may include updating, by the home-network router, a reverse proxy maintained in the home-network router through application logic, wherein the reverse proxy is configured to forward requests from operation of the user-selected container to one or more remote servers.

Some aspects of the present disclosure include transmitting, from the home-network router to a remote computing device, a notification that the application associated with the user-selected container is deployed. Some aspects of the present disclosure include transmitting, by the home-network router to the container registry, a container download request in response to receiving the container acquisition data. The home-network router may download, from the container registry, the user-selected container using the rules for downloading the user-selected container in response to transmitting a container download request to the remote container registry. Updating the reverse proxy may comprise updating at least one of a DNS configuration, firewall rule, or hostname configuration to support the application associated with the user-selected container. The operation of application logic of the user-selected container may be initiated by an application orchestration module. Also, downloading the user-selected container may include downloading the user-selected container to an orchestration database, wherein the application orchestration module and the orchestration database are included in the home-network router. The user-selected container may include a home automation application. The user-selected container may include at least one application selected from Pi-hole, Hass.io, or Homebridge.

Some aspects may include receiving, at the home-network router from the remote computing device, a message for interacting with the application associated with the user-selected container. Also, the message for interacting with the application associated with the user-selected container may be forwarded from the reverse proxy to a third-party remote server in response to receiving the message from the remote computing device, wherein the third-party remote server provides services for the application associated with the user-selected container.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

FIG. 2 illustrates an example communication flow diagram of an application deployment from a remote server to a home-network router in accordance with various embodiments.

DETAILED DESCRIPTION

Figure 1A:
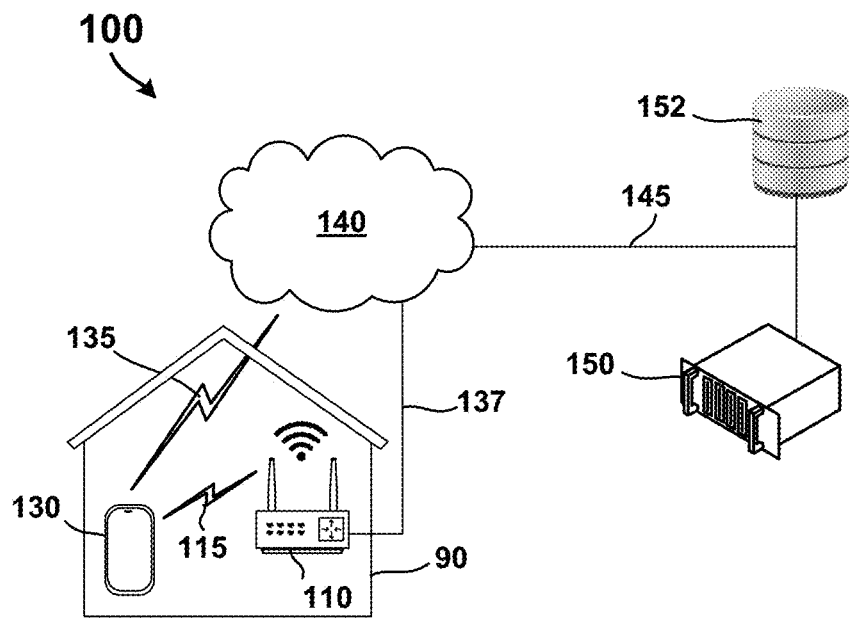
FIGS. 1A and 1B are schematic diagrams conceptually illustrating a system for delivering primary and secondary video content to a television with a set-top box in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include systems and methods for deploying home-network-based Apps onto a home-network router, without the need for additional hardware, and enabling the home-network router to automatically configure itself based on the application being deployed. Multiple applications may be run from a router using a reverse proxy. Thus, various embodiments include a reverse proxy, which is set up on a home-network router and which routes traffic for a particular application. This allows a user to download available applications to a home-network router and run those applications from that router with just a click of a button. The user may browse through a catalog of available applications, click a button, and the application can be downloaded and run on their home-network.

Applications installed on and running from a home-network router can provide advantages over applications installed on smart-phones or other computing devices. For example, an App running from a home-network router may be installed once but accessed from any number of smart-phones or other computing devices without having to install that App on numerous computing devices that might need to use it. In this way, users may access a web site from any computing device, which may then provide access to the App running from the home-network router.

The high-level components may include a container registry accessible on or through a remote server (e.g., an ISP or cloud-based server), a local router (e.g., a home-network router), and a user computing device (e.g., a smart phone). The user computing device may access a list of applications available in the container registry (i.e., a whitelist) and request a download of a desired container from the list. In various embodiments, the home-network router may be augmented to include a reverse proxy, an orchestration App, and a configuration database. The orchestration App may:
  a) download the App from the container registry onto the home-network router;
  b) configure itself for receiving and running the container;
  c) update the reverse proxy to correctly route traffic for the App; and
  d) update any routing rules required to make the application work.

Additionally, depending on the application, the orchestration application my update DNS rules, DHCP rules, firewall rules. Since all these updates are being done on the same router (e.g., the home-network router), the updates may be coordinated so as to be run in a single pass.

Various embodiments include methods, systems, and devices for deploying an application associated with a user-selected container on a home-network router. In particular, various embodiment may receive, at the home-network router from a remote server, container acquisition data; initiate operation of application logic of the user-selected container; update a reverse proxy maintained in the home-network router through application logic; and transmit to a remote computing device a notification that the application associated with the user-selected container is deployed.

As used herein, the term "home-network router" refers to a piece of network hardware that allows communication between electronic devices on a local home network—like personal computers, mobile computing devices, lights, appliances, doors, locks, printers, and other connected devices—and the internet.

As used herein, the term "computing device" refers to an electronic device equipped with at least a processor, communication systems, and memory configured to initiate the deployment of an application associated with a user-selected container on a home-network router. Computing devices may include, but are not limited to, any one or all of personal computers, portable computing devices, rack mounted computers, routers, mobile devices, cellular telephones, smart phones, smart watches, smart buttons, smart appliances, personal or mobile multi-media players, personal data assistants (PDAs), tablet computers, smart books, palm-top computers, desk-top computers, wireless electronic mail receivers, cellular telephones, wireless gaming controllers, streaming media players (such as, ROKU®), smart televisions, DVRs, modems, satellite or cable set top boxes, smart remote control devices (i.e., television remote controls with sufficient processing capabilities), and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

FIG. 1A illustrates an example of an application deployment environment 100 in accordance with various embodiments. The application deployment environment 100 may include a home-network router 110, which may be located in a home 90 or other building/area, a user computing device 130, and a remote server 150 (e.g., a cloud-based server) that may be accessed via a communication network 140. A user of the user computing device 130 that wants to download of a particular application onto the home-network router 110 may send an available application request to the remote server 150 for determining what applications are available and/or whether a particular application is available. The remote server 150 may obtain a list of available applications (e.g., a white list) from a container registry 152, which list the remote server may provide or make available to the user computing device 130. The container registry 152 may hold one or more containers, each corresponding to an application that is approved and/or available for download and includes all the configuration information and orchestration rules needed to download and run the application. A container is a standard unit of software that packages up code and all its dependencies so an application may run reliably from one computing environment to another. Available for select operating systems, such as Linux and Window, containerized software will always run the same, regardless of the infrastructure. Once an available application is selected by the user, which then corresponds to a user-selected container, the remote server 150 may transmit container acquisition data for the user-selected container to the home-network router 110. Alternatively, the container acquisition data may be transmitted directly from the container registry 152. Once the container acquisition data is received, the home-network router 110 may automatically download the user-selected container from the container registry 152 to setup and run the associated application.

The home-network router 110 may be a home network hardware device that enables communication between other local home network devices—like one or more home network computing devices, lights, appliances, doors, locks, printers, and other connected devices (e.g., the user computing device 130)—and the internet. The home-network router 110 may include the functionality of a modem, which lets the home network computing devices access the internet. Alternatively, the home-network router 110 may be connected to and work with a separate modem that connects the home-network router 110 to the internet.

The user computing device 130 may be any electronic device equipped with at least a processor, communication systems, and memory configured to initiate the deployment of an application associated with a user-selected container on a home-network router. The remote server 150 may be any electronic device equipped with at least a processor, communication systems, and memory configured to store and deploy containers to the home-network router 110.

The user computing device 130 may be coupled to the home-network router 110 by a short-range wireless connection 115 (e.g., Wi-Fi, Bluetooth, etc.) or alternatively, or additionally, via the communication network 140 through a long-range wireless connection 135 and one or more wired connections 137. Similarly, the home-network router 110 and user computing device 130 may be coupled to the remote server by way of the communication network 140 and one or more additional wired and/or wireless connections 145.

The communication links 115, 135, 137, 145 may use a variety of wireless (e.g., 5g-NR(u), LTE, Citizens Broadband Radio Service (CBRS), etc.) and/or wired networks (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Figure 1B:
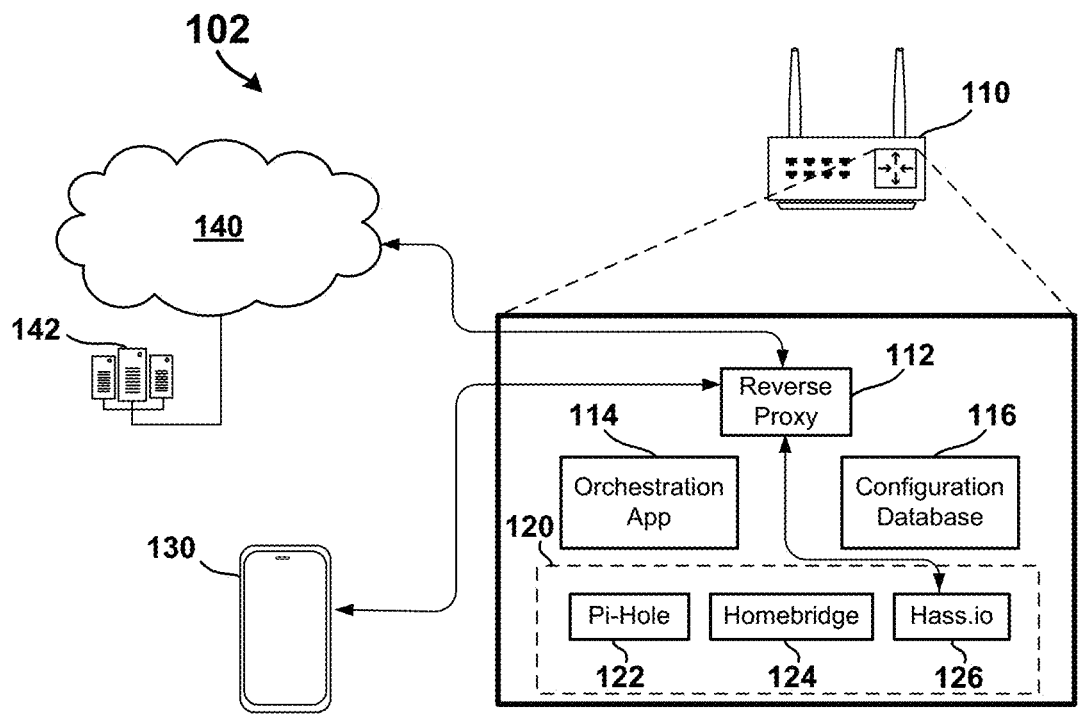

FIG. 1B illustrates an example of a home-network router-based application environment 102 in accordance with various embodiments. With reference to FIGS. 1A and 1B, the illustration of the home-network router 110 and/or other components is not intended to be limiting. The home-network router 110 may include a plurality of hardware, software, and/or firmware components operating together to provide the functionality attributed herein to the home-network router 110. In some embodiments, the home-network router 110 may include electronic storage, one or more processors, and/or other components. In addition, the home-network router 110 may be configured to work and communicate with one or more remote computing devices (e.g., 130, 150, 152) and/or external resources through wired and/or wireless connections via one or more communication networks (e.g., 140). Thus, the home-network router 110 may include communication lines, or ports, to enable the exchange of information with the remote computing device(s), external resources, and/or other computing platforms.

The electronic storage (e.g., 502 in FIG. 5) may comprise non-transitory storage media that electronically stores information. The electronic storage media of the electronic storage may include one or both of system storage that is provided integrally (i.e., substantially non-removable) with the home-network router 110 and/or removable storage that is removably connectable to the home-network router 110 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s) (e.g., 501 in FIG. 5), information received from the home-network router 110, information received from other computing device(s), external resources and/or other information that enables the home-network router 110 to function as described herein.

The processor(s) of the home-network router 110 may be configured to provide information processing capabilities. As such, the processor(s) may include one or more of a digital processor, an analog processor, a digital circuit designed to process information, an analog circuit designed to process information, a state machine, and/or other mechanisms for electronically processing information. The processor(s) may be a single unit or may include a plurality of processing units. The one or more processing units may be physically located within the same device, or one or more of the processor(s) may represent processing functionality of a plurality of devices, remote from one another and operating in coordination.

The home-network router 110 may be configured by machine-readable instructions. The machine-readable instructions may include one or more instruction modules. The instruction modules may include computer program modules. In various embodiments, the home-network router 110 may include or be augmented to include a reverse proxy 112, an orchestration application (i.e. an orchestration App) 114, and a configuration database 116 for setting up and running home-network router-based applications. The reverse proxy 112, orchestration App 114, and the configuration database 116 may be built into the firmware of the home-network router 110, and released or optionally released as a firmware upgrade to the home-network router 110. Packages may be included in the build for the open source components of the home-network router 110, which open source components may be added (such as using Nginx), and then the orchestration App 114 could be written as code and compiled with the firmware.

The reverse proxy 112 may operate like a traditional proxy server, which typically sits behind a firewall in a private network, and directs client requests (e.g., from the user computing device 130) to the appropriate backend server (e.g., https://pi-hole.net, https://homebridge.io/, https://hass.io/). A reverse proxy may accept requests from a client, forward it to a server that can fulfill it, and return the server's response to the client. The reverse proxy 112 may provide an additional level of abstraction and control to ensure the smooth flow of home-network traffic between clients and servers. In addition, the reverse proxy 112 may be configured to download user-selected containers; keep track of which containers are downloaded and/or running; determine how to route requests from the computing device the user is using (e.g., mobile device) to interact with the home-network router 110; and route the traffic to the correct container based on what domain is being queried. Reverse proxies are typically found on a cloud server and not hosted on a local network router. Various embodiments update the configuration of the router-based reverse proxy so it can properly route traffic for services running through the home-network router 110.

The orchestration App 114 may manage and coordinate the download of each user-selected container from the container registry (e.g., 152), set up the user-selected container, update the reverse proxy 112 to correctly route traffic associated with the user-selected container, and update any routing rules required to make the application work. Additionally, depending on the application, the orchestration App 114 my update DNS rules, dynamic host configuration protocol (DHCP) rules, firewall rules, etc. Since all of these updates may be performed on the same home-network router 110, they may all be coordinated and done in one single pass for improved efficiency.

The configuration database 116 may store the configuration rules, settings, and parameters associated with each container and its associated App. In addition, the configuration database may store information regarding source of container in registry, custom user configurations (e.g., Pi-hole settings configured to only impact a specific device), firewall rules, proxy routing rules, a unique ID to track applications, and traditional configuration parameters for containers (such as exit on fail, storage, etc.). Other additional configurations for containers may be stored.

Using the reverse proxy 112, orchestration App 114, and the configuration database 116 various embodiments may install one or more home-network Apps 120 on the home-network router 110. For example, the home-network router-based application environment 102 includes some exemplary home-network Apps installed in the home-network router 110, in accordance with various embodiments. In particular, the home-network router 110 may include Apps such as Pi-hole 122, Homebridge 124, and Hass.io 126. Pi-hole 122 is an add blocker, which allows the home-network router 110 to run domain queries through the home-network router 110. Pi-hole 122 may operate as an ad-blocker that may perform a lookup to determine whether any of the domain queries are for advertisements. During operation, Pi-hole 122 may drop any queries identified as ads. For example, online broadcasts or other content that is downloaded may generally contain references to where to get advertisements. Thus, Pi-hole 122 may function to allow the download of the content, but block the requests that may be made for advertisements or advertising content. Homebridge 124 is an application that may link IoT devices to home automation systems. Hass.io 126 is a home assistant App that may provide IoT aggregation and a rules engine. Hass.io 126 establishes communication links to any IoT device with a local network. Hass.io 126 may communicate with other devices on a local network and allows a user to set up rules (e.g., turn off lights at a designated time or when a recognized mobile device joins the local network, turn on designated lights).

Once the home-network router 110 is configured with the user-selected container, the user may interact with the home-network App associated with the user-selected container. Also once the App is configured, the home-network router 110 may push a notification to the remote server 150 indicating that the App is now running and/or available. The remote server 150 and/or the home-network router 110 may notify the user, through the user computing device 130, that the home-network App is ready for user interface and may provide a link for the user to do so. The user may use the link (e.g., by clicking the link on the user computing device 130) to communicate with the home-network App running on the home-network router 110, which may in-turn communicate with an App server of the home-network App. For example, the user may launch a link from the user computing device 130 for the Hass.io App running on the home-network router 110, which may in-turn communicate with a Hass.io server 142 via the communication network 140 (i.e., the Internet).

FIG. 2 illustrates an example communication flow diagram 200 for deployment of an application associated with a user-selected container from a remote server onto a home-network router in accordance with various embodiments. With reference to FIGS. 1A-2, in various embodiments, the operations of the communication flow diagram 200 may be performed by the home-network router 110, the user computing device 130, the remote server 150, and the container registry 152.

To initiate the download of a new home-network application onto the home-network router 110, the user computing device 130 may transmit an App availability request message 210 to the remote server 150. The App availability request message 210 may represent a request for a list of all available Apps, a subset of all available Apps (e.g., from search criteria), or inquire about the availability of a particular App. The user computing device 130 may initiate the transmittal of the App availability request message from an Internet web page or a local App running on the user computing device 130. In response to receiving the App availability request message 210, the remote server 150 may perform an App availability determination 212 to identify what Apps may be available that correspond to the App availability request message 210 (e.g., lookup an ISP container whitelist). The determined list of available Apps may be a curated list (e.g., a white list), particularly for home-network routers (e.g., 110). Alternatively or additionally, the list of available Apps may be limited to those Apps compatible with the particular home-network router 110 or a category of home-network router that includes the home-network router 110 for which the App availability request message 210 was made. The determined list of available Apps may be limited by search parameters included in the App availability request message 210. For example, the App availability request message 210 may have included an identifier, the name, or part of the name of a particular App.

In response to determining which Apps may be available from the App availability determination 212, the remote server 150 may transmit the available App list 220 to the user computing device 130 for the user to consider. The user of the user computing device 130 may then search and/or consider 222 the received available App list 220. If a desired App is on the received available App list 220, the user may select the desired App for installation on the home-network router 110. In this way, the user computing device 130 transmits a container download request 230 to the remote server 150.

From a user's perspective, the process from transmitting the App availability request message 210 through to transmitting the container download request 230 may be part of the user navigating to a website or using a local application that shows a curated list of available applications that may run on the home-network router 110. The user may then select to install an application, which will transmit the container download request 230, which will initiate the process of installing the application on the home-network router 110.

In response to receiving the container download request 230 from the user computing device 130, the remote server 150 may push container acquisition data 235 to the home-network router 110. For example, using a predetermined run script or configuration script for the App, the remote server 150 may transmit the push container acquisition data 235, which may include configuration information and the orchestration rules for receiving, installing, and running that container.

In response to receiving the container acquisition data 235, the home-network router 110 may transmit a container download request 240 for the user-selected container to the container registry 152. The home-network router 110 may have determined any formatting or coding needed for generating and transmitting the container download request 240 from the received container acquisition data 235. In response thereto, the container registry 152 may transmit the user-selected container 250 to the home-network router 110.

Once the user-selected container 250 is downloaded, the home-network router 110 may spin up 252 the user-selected container 250 based on the configuration information included in the container acquisition data 235. In addition, the home-network router 110 may update 254 the reverse proxy (e.g., 112) based on the configuration information included in the container acquisition data 235.

Once the App associated with the user-selected container is installed and running, the home-network router 110 may transmit a successful install notification 260 to the remote server 150, which indicates the App is installed and running.

In response to the remote server 150 receiving the successful install notification 260, the remote server 150 may transmit a successful application deployment notification 265 to the user computing device 130 indicating that the associated with the user-selected container is deployed (i.e., installed and/or running on the home-network router 110), which may include providing a link for launching a user interface for the App that was successfully deployed.

In this way, the home-network router 110 may be programmed with one or more new applications, provided with the configuration rules, host name, and routing information needed for each of the new applications.

Figure 3:
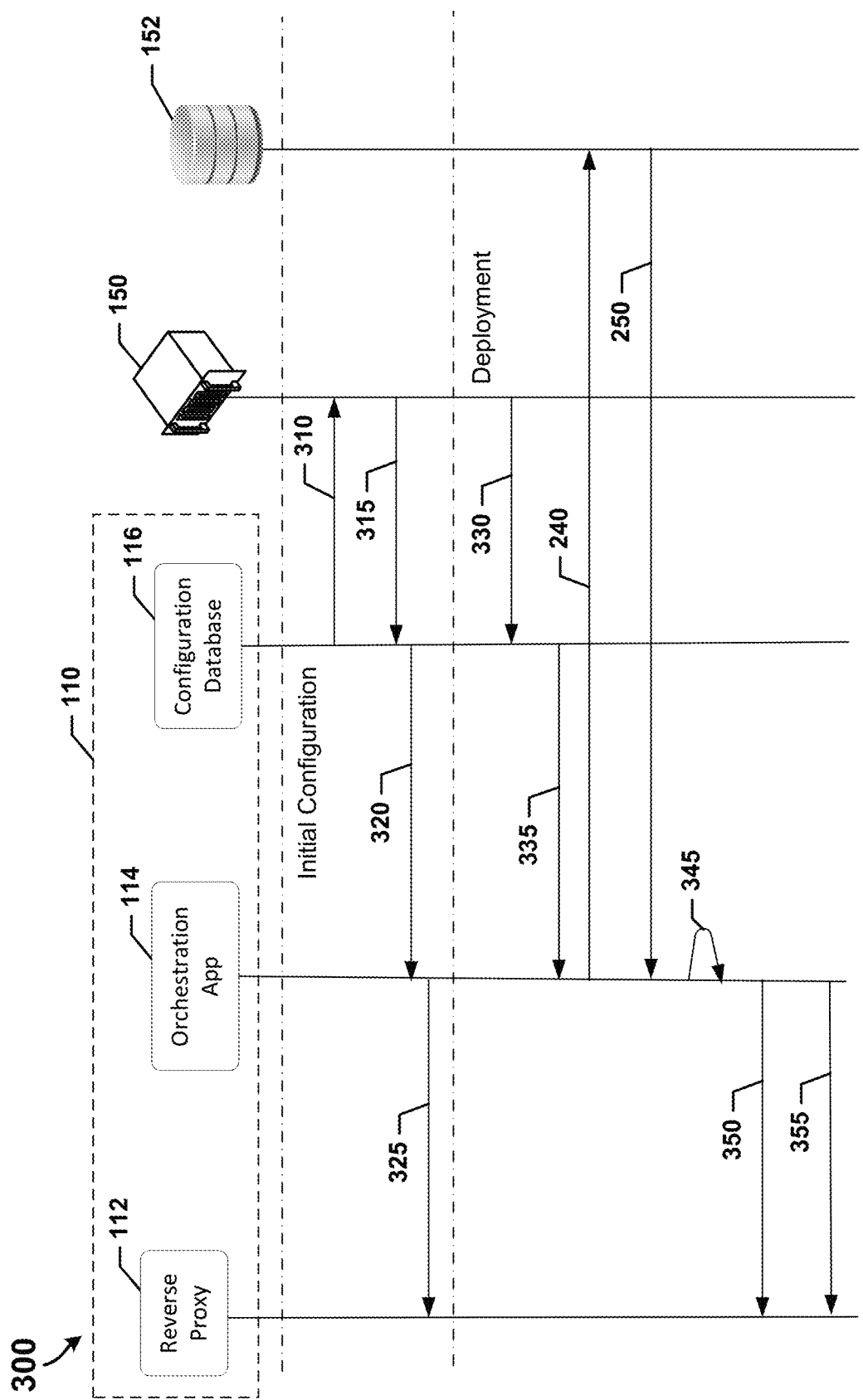
FIG. 3 illustrates an example communication flow diagram of a setup process for a reverse proxy, orchestration App, and configuration database on a home-network router in accordance with various embodiments.

FIG. 3 illustrates an example communication flow diagram 300 of a setup process for a reverse proxy, orchestration App, and configuration database on a home-network router in accordance with various embodiments. With reference to FIGS. 1A-3, in various embodiments, the operations of the communication flow diagram 300 may be performed by the home-network router 110, particularly the reverse proxy 112, orchestration App 114, and the configuration database 116, in conjunction with the remote server 150 and the container registry 152.

As part of an 'Initial Configuration' to prepare the home-network router 110 for subsequent installation of home-network Apps, the configuration database 116 may initially establish a connection 310 with the remote server 150. The connection 310 may be established after the home-network router 110 comes on-line for the first time. The firmware of the home-network router 110 maintaining the configuration database 116 may come with one or more pre-installed routines for establishing the connection 310 with the remote server 150.

In response to the connection 310 being established, the remote server 150 may push an initial configuration file 315 to the configuration database 116. The initial configuration file 315 may configure the configuration database 116 to start with no application data. Alternatively, the configuration file 315 may configure the configuration database 116 to start with one or more default applications thereon.

In response to receiving the initial configuration file 315, the configuration database 116 may transmit a new configuration update 320 to the orchestration App 114. Similarly, the orchestration App 114 may in-turn transmit and/or write new proxy configuration routing 325 to the reverse proxy 112. If no applications are initially loaded by default in the configuration database 116, the new proxy configuration routing 325 may disable the reverse proxy 112 since no routable serves would be configured.

As an initial part of 'Deployment' of one or more home-network Apps, the remote server 150 may transmit (i.e., push) acquisition information 330 (e.g., container acquisition data 235) to the configuration database 116, which may be stored therein. The transmission by the remote server 150 of the acquisition information 330 may be in response to the remote server 150 receiving a container download request from a user computing device (e.g., 130). In response receiving the acquisition information 330, the configuration database 116 may forward new App configuration information 335 (e.g., container acquisition data 235) to the Orchestration App 114. The configuration database 116 may store information persistently for use in future (e.g., on reboot). In contrast, the Orchestration App 114 may load the data from the configuration database 116 into memory as indicated by the new App configuration information 335. Thereafter, the orchestration app 114 may transmit the container download request 240 for the user-selected container to the container registry 152 and receive the user-selected container 250 in response thereto. Once the user-selected container is downloaded, the orchestration app 114 may run 345 the user-selected container, which may bind specific router ports for the App associated with the user-selected container. In addition, the orchestration app 114 may transmit and/or write App-specific proxy configuration routing 350 to the reverse proxy 112 and transmit a proxy restart command 355 to ensure the reverse proxy routes traffic accordingly.

Once a new App is deployed and the home-network router 110 is reconfigured for the new App, the user may now interact with the App on the home-network router 110. Also, once the new App is deployed, the home-network router 110 may push a notification to the remote server 150 indicating that the new App is now running and/or available. In addition, the remote server 150 may notify the user that the App is ready for user interface and provide a link for the user to do so. In response to the user clicking the provided link, the user's computing device (e.g., 130) may communicate with the App the home-network router 110 and interface with the application software.

FIGS. 4A-4E illustrates operations of a methods 400, 401, 402, 403, and 404 that may be implemented for setting up and operating a system for delivering secondary video content. The operations of the methods 400, 401, 402, 403, and 404 presented below are intended to be illustrative. In some embodiments, the methods 400, 401, 402, 403, and 404 may be accomplished with one or more additional operations not described, and/or without one or more of the operations discussed. Additionally, the order in which the operations of methods 400, 401, 402, 403, and 404 are illustrated in FIGS. 4A, 4B, 4C, 4D, and/or 4E and described below is not intended to be limiting.

In some embodiments, methods 400, 401, 402, 403, and 404 may be implemented in one or more processors (e.g., 501, 601, 702, and 704 in FIGS. 5-7, respectively) in conjunction with memory (e.g., 502, 602, 713, 725). The one or more processor(s) may include one or more device(s) executing some or all of the operations of the methods 400, 401, 402, 403, and 404 in response to instructions stored electronically on an electronic storage medium. The one or more processor(s) may include one or more devices configured through hardware, firmware, and/or software to be specifically designed for execution of one or more of the operations of the methods 400, 401, 402, 403, and 404. For example, with reference to FIGS. 1A-4E, the operations of the methods 400, 401, 402, 403, and 404 may be performed by a processor of the home-network router (e.g., 110) with deep learning computational capabilities.

Figure 4A:
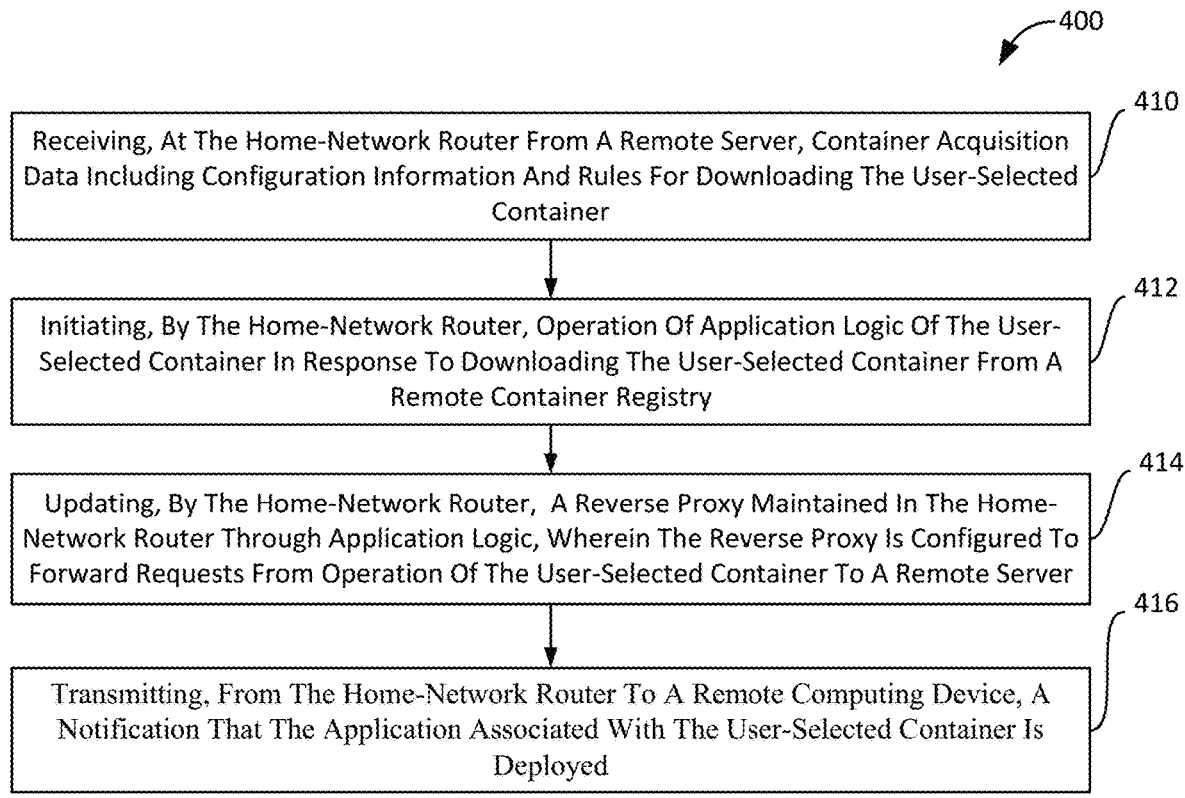
FIGS. 4A-4E are process flow diagrams illustrating embodiment methods for deploying an application associated with a user-selected container on a home-network router suitable for use with various embodiments.

FIG. 4A illustrates the method 400, in accordance with one or more embodiments. In block 410, the home-network router may receive, from a remote server, container acquisition data including configuration information and rules for downloading the user-selected container. The container acquisition data received in block 410 may be received by one or more processors through a transceiver (e.g., 505, 605, 708 in FIGS. 5-7). In various embodiments, the reception of container acquisition data in block 410 may be performed primarily or entirely by one or more processors in the home-network router (e.g., 110), the user computing device(s) (e.g., 130), and/or a remote computing device (e.g., 150, 152) and may be performed separately for different containers in parallel.

In block 412, the home-network router may initiate operation of application logic of the user-selected container in response to downloading the user-selected container from a remote container registry. The initiation of application logic in block 412 may be performed primarily or entirely by one or more processors in the home-network router (e.g., 110), the user computing device(s) (e.g., 130), and/or a remote computing device (e.g., 150, 152) and may be performed separately for different containers in parallel.

In block 414, the home-network router may update a reverse proxy maintained in the home-network router through application logic, wherein the reverse proxy is configured to forward requests from operation of the user-selected container to one or more remote servers. The update of the reverse proxy in block 412 may be performed primarily or entirely by one or more processors in the home-network router (e.g., 110), the user computing device(s) (e.g., 130), and/or a remote computing device (e.g., 150, 152) and may be performed separately for different containers in parallel.

In block 416, the home-network router may transmit to a remote computing device, a notification that the application associated with the user-selected container is deployed. The deployment notification transmitted in block 416 may be sent by one or more processors through a transceiver (e.g., 505, 605, 708 in FIGS. 5-7). The transmission in block 416 may be performed primarily or entirely by one or more processors in the home-network router (e.g., 110), the user computing device(s) (e.g., 130), and/or a remote computing device (e.g., 150, 152) and may be performed separately for different containers in series and/or parallel.

In some embodiments, the processor may repeat the operations in blocks 410, 412, 414, and 416 to periodically or continuously set up and operate a system for deploying an application associated with a user-selected container.

Figure 4B:
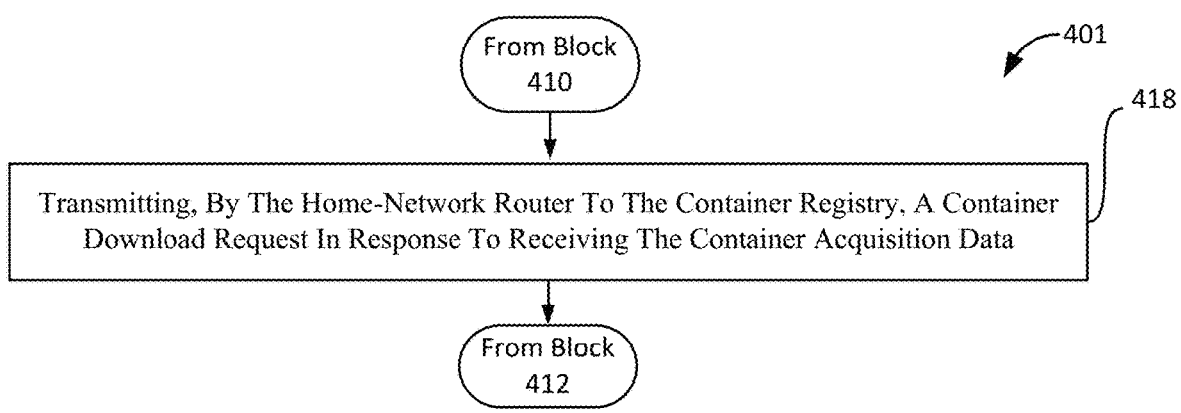

FIG. 4B illustrates the method 401, in accordance with one or more embodiments. In block 418, following the operations in block 410 of the method 400, the home-network router may perform operations including transmitting a container download request to a container registry, in response to receiving the container acquisition data. The container download request transmitted in block 418 may be transmitted by one or more processors through the transceiver (e.g., 505, 605, 708 in FIGS. 5-7). In various embodiments, the transmission of the container download request in block 418 may be performed primarily or entirely by one or more processors in the home-network router (e.g., 110), the user computing device(s) (e.g., 130), and/or a remote computing device (e.g., 150, 152) and may be performed separately for different containers in parallel. Following the operations in block 418, the home-network router may perform the operations in block 412 as described. In some embodiments, the processor may repeat the operations in blocks 410, 412, 414, 416, and 418 to periodically or continuously set up and operate a system for deploying an application associated with a user-selected container.

Figure 4C:
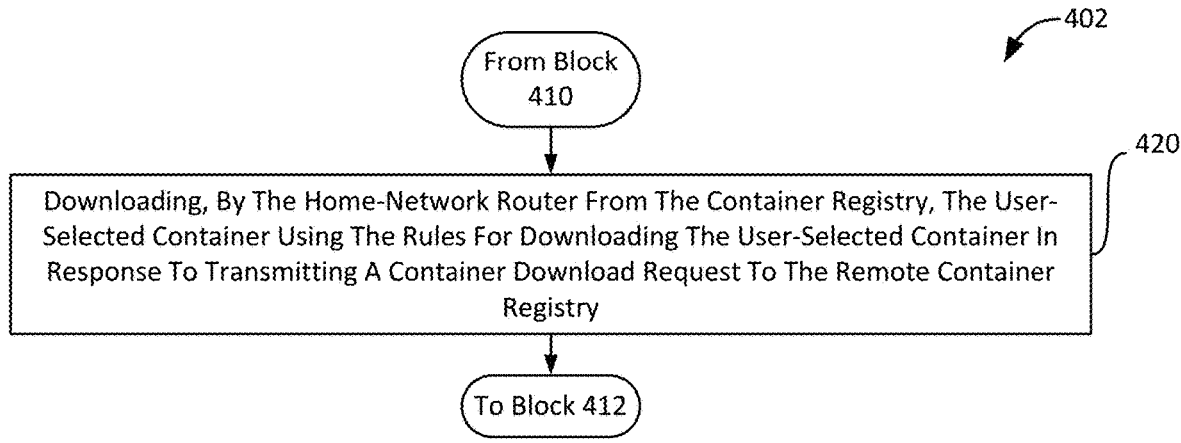

FIG. 4C illustrates the method 402, in accordance with one or more embodiments. In block 420, following the operations of block 410 the home-network router may perform operations including downloading the user-selected container using the rules for downloading the user-selected container in response to transmitting a container download request to the remote container registry. The download of the user selected container in block 420 may be performed by one or more processors through the transceiver (e.g., 505, 605, 708 in FIGS. 5-7). In various embodiments, the download of the user selected container in block 420 may be performed primarily or entirely by one or more processors in the home-network router (e.g., 110), the user computing device(s) (e.g., 130), and/or a remote computing device (e.g., 150, 152) and may be performed separately for different containers in parallel.

Following the operations in block 420, the home-network router may perform the operations in block 412 as described. In some embodiments, the processor may repeat the operations in blocks 410, 412, 414, 416, 418, and/or 420 to periodically or continuously set up and operate a system for deploying an application associated with a user-selected container.

Figure 4D:
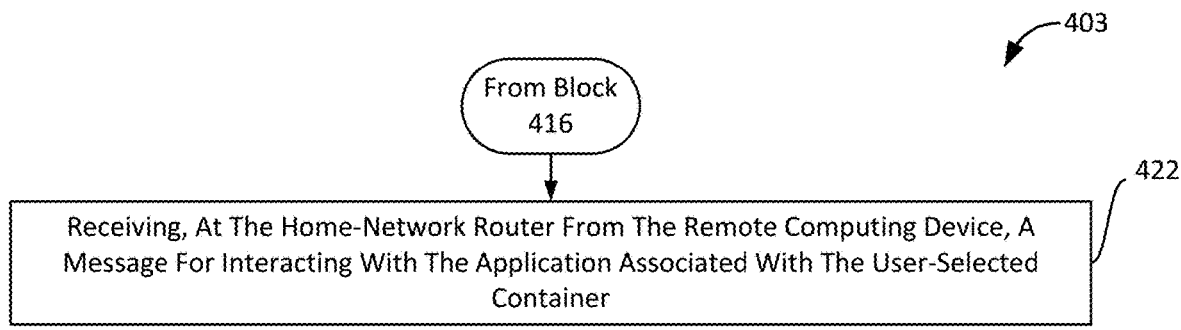

FIG. 4D illustrates the method 403, in accordance with one or more embodiments. In block 422, following the operations of block 416 the home-network router may perform operations including receiving a message for interacting with the application associated with the user-selected container from the remote computing device. The reception of the message in block 422 may be performed by one or more processors through the transceiver (e.g., 505, 605, 708 in FIGS. 5-7). In various embodiments, the reception of the message in block 422 may be performed primarily or entirely by one or more processors in the home-network router (e.g., 110), the user computing device(s) (e.g., 130), and/or a remote computing device (e.g., 150, 152) and may be performed separately for different containers in parallel.

In some embodiments, the processor may repeat the operations in blocks 410, 412, 414, 416, and/or 422 to periodically or continuously set up and operate a system for deploying an application associated with a user-selected container.

Figure 4E:
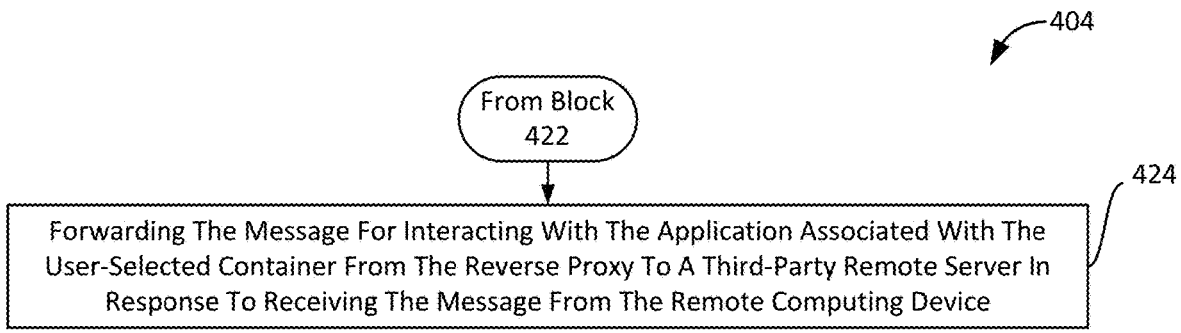

FIG. 4E illustrates the method 407, in accordance with one or more embodiments. In block 424, following the operations of block 422 the home-network router may perform operations including forwarding the message for interacting with the application associated with the user-selected container from the reverse proxy to a third-party remote server in response to receiving the message from the remote computing device. The third-party remote server may provide services for the application associated with the user-selected container. The forwarding of the message in block 424 may be performed primarily or entirely by one or more processors in the home-network router (e.g., 110), the user computing device(s) (e.g., 130), and/or a remote computing device (e.g., 150, 152) and may be performed separately for different containers in parallel.

In some embodiments, the processor may repeat the operations in blocks 410, 412, 414, 416, 422, and/or 424 to periodically or continuously set up and operate a system for deploying an application associated with a user-selected container.

Figure 5:
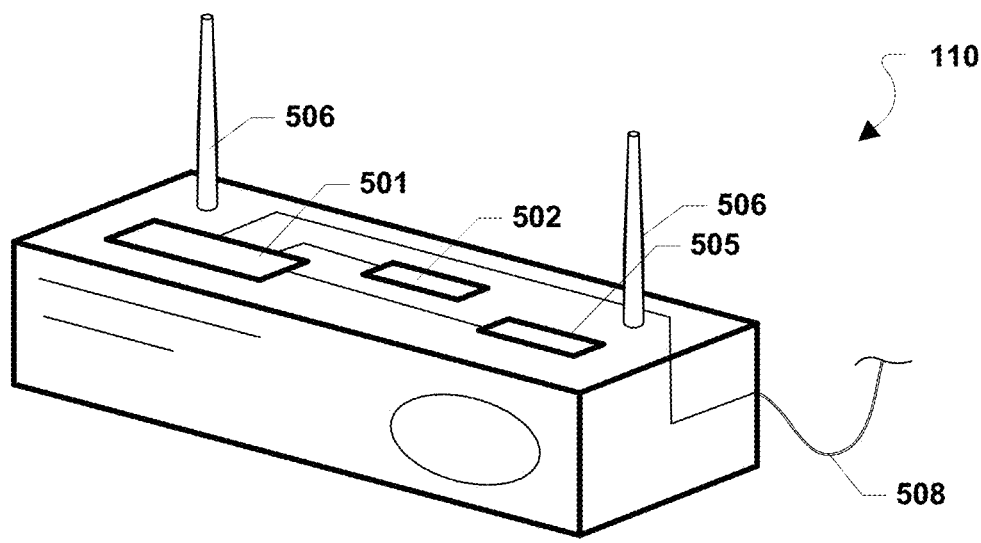
FIG. 5 is a component diagram of an example home-network router suitable for use with various embodiments.

The various embodiments (including, but not limited to, embodiments discussed above with reference to FIGS. 1A-4E) may also be implemented on any of a variety of home-network routers, as illustrated in FIG. 5. With reference to FIGS. 1A-5, a home-network router 110 may include a processor 501 coupled to volatile memory 502. The home-network router 110 may also include one or more connections or port(s) 506 coupled to the processor 501 and configured to input and/or output data from the port(s) 508. The home-network router 110 may also include one or more network transceivers 505, with one or more antenna 506 coupled thereto, providing a network access port, coupled to the processor 501 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The home-network router 110 may transmit and/or receive data or other communications via the network transceiver 505 and/or the port(s) 508.

Figure 6:
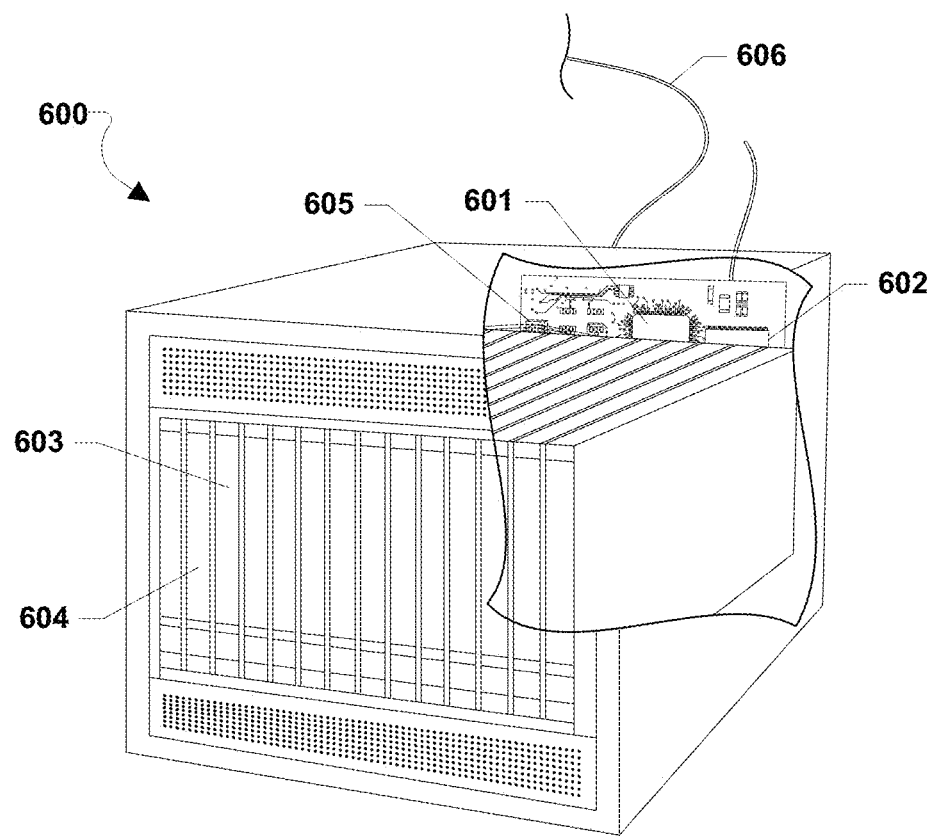
FIG. 6 is a component diagram of an example server suitable for use with the various embodiments.

Various embodiments (including, but not limited to, embodiments discussed above with reference to FIGS. 1A-4E) may be implemented on any of a variety of commercially available servers (e.g., 150, 152), which may be used/accessed by a user computing device (e.g., 130) and/or a home-network router (e.g., 110), such as the server 600 illustrated in FIG. 6. The server 600 may include a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing data connections with a network connection circuit 605 and a communication network (e.g., IP network) coupled to other communication system network elements.

Figure 7:
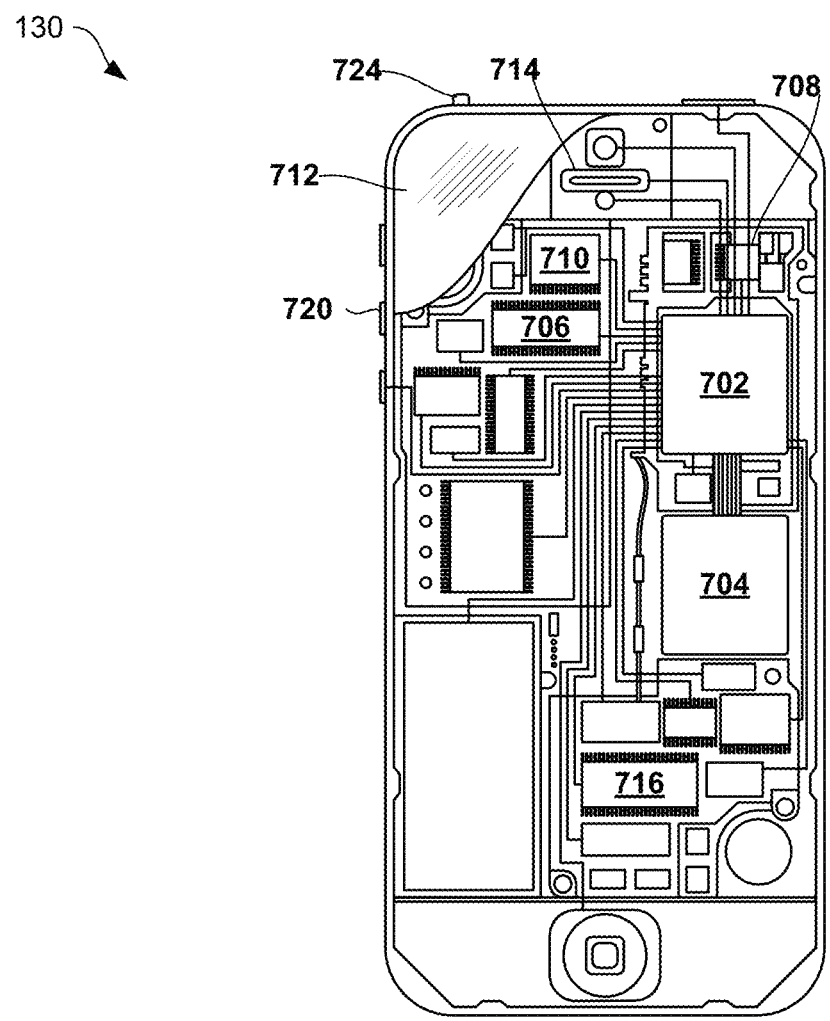
FIG. 7 is a component diagram of an example user computing device suitable for use with various embodiments.

Various embodiments (including, but not limited to, embodiments discussed above with reference to FIGS. 1A-4E) may be implemented on or in conjunction with a variety of computing devices, an example of which is illustrated in FIG. 7 in the form of a user computing device 130. With reference to FIGS. 1A-7, the user computing device 130 may include a first system-on-chip (SoC) 702 (e.g., a SoC-CPU) coupled to a second SoC 704 (e.g., a 5G capable SoC), such as D2D links establish in the dedicated ITS 5.9 GHz spectrum communications. The first and/or second SOCs 702, 704 may be coupled to internal memory 713, 725, a display 715, and to a speaker 714. Additionally, the user computing device 130 may include one or more antenna 724 for sending and receiving electromagnetic radiation that may be connected to one or more wireless transceivers 708 (e.g., a wireless data link and/or cellular transceiver, etc.) coupled to one or more processors in the first and/or second SOCs 702, 704. Mobile computing devices 700 may also include menu selection buttons or rocker switches 720 for receiving user inputs.

User computing devices 130 may additionally include a sound encoding/decoding (CODEC) circuit 710, which digitizes sound received from a microphone into data packets suitable for wireless transmission and decodes received sound data packets to generate analog signals that are provided to the speaker to generate sound. Also, one or more of the processors in the first and/or second SOCs 702, 704, wireless transceiver 708 and CODEC circuit 710 may include a digital signal processor (DSP) circuit (not shown separately).

The processors 501, 601, 702, and 704 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 501, 601, 702, and 704. The processors 501, 601, 702, and 704 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 501, 601, 702, and 704 including internal memory or removable memory plugged into the device and memory within the processors 501, 601, 702, and 704 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for deploying an application associated with a user-selected container on a home-network router, comprising:

receiving, at a processor of the home-network router from a remote server, container acquisition data including configuration information and rules for downloading the user-selected container in response to a selection of the user-selected container by a remote computing device for installation of a select application on the home-network router from the remote server, wherein the remote computing device is separate from the home-network router;

initiating, by the processor of the home-network router, operation of application logic of the user-selected container for installation of the select application in response to downloading the user-selected container from a remote container registry; and updating, by the processor of the home-network router, a reverse proxy maintained in the home-network router through application logic, wherein the reverse proxy is configured to forward requests from operation of the user-selected container to one or more remote servers.

2. The method of claim 1, further comprising:
transmitting, by the home-network router to the remote container registry, a container download request in response to receiving the container acquisition data.

3. The method of claim 1, further comprising:
downloading, by the home-network router from the remote container registry, the user-selected container using the rules for downloading the user-selected container in response to transmitting a container download request to the remote container registry.

4. The method of claim 1, wherein updating the reverse proxy comprises updating at least one of a DNS configuration, firewall rule, or hostname configuration to support the application associated with the user-selected container.

5. The method of claim 1, wherein operation of application logic of the user-selected container is initiated by an application orchestration module; and
downloading the user-selected container comprises downloading the user-selected container to an orchestration database, wherein the application orchestration module and the orchestration database are included in the home-network router.

6. The method of claim 1, wherein the user-selected container includes a home automation application.

7. The method of claim 1, wherein the user-selected container includes at least one application selected from Pi-hole, Hass.io, or Homebridge.

8. The method of claim 1, further comprising:
receiving, at the home-network router from the remote computing device, a message for interacting with the application associated with the user-selected container.

9. The method of claim 8, further comprising:
forwarding the message for interacting with the application associated with the user-selected container from the reverse proxy to a third-party remote server in response to receiving the message from the remote computing device, wherein the third-party remote server provides services for the application associated with the user-selected container.

10. The method of claim 1, further comprising:
transmitting, from the home-network router to the remote computing device, a notification that the application associated with the user-selected container is deployed.

11. A home-network router comprising:
a transceiver; and
a processor coupled to the transceiver, wherein the processor is configured with processor-executable instructions to perform operations for deploying an application associated with a user-selected container on a home-network route, the operations comprising:
receiving, from a remote server, container acquisition data including configuration information and rules for downloading the user-selected container in response to a selection of the user-selected container by a remote computing device for installation of a select application on the home-network router from the remote server, wherein the remote computing device is separate from the home-network router;

initiating operation of application logic of the user-selected container for installation of the select application in response to downloading the user-selected container from a remote container registry; and updating a reverse proxy maintained in the home-network router through application logic, wherein the reverse proxy is configured to forward requests from operation of the user-selected container to one or more remote servers.

12. The home-network router of claim 11, wherein the processor is configured with processor-executable instructions to perform operations further comprising:
transmitting, by the home-network router to the remote container registry, a container download request in response to receiving the container acquisition data.

13. The home-network router of claim 11, wherein the processor is configured with processor-executable instructions to perform operations further comprising:
downloading, by the home-network router from the remote container registry, the user-selected container using the rules for downloading the user-selected container in response to transmitting a container download request to the remote container registry.

14. The home-network router of claim 11, wherein the processor is configured with processor-executable instructions to perform operations such that updating the reverse proxy comprises updating at least one of a DNS configuration, firewall rule, or hostname configuration to support the application associated with the user-selected container.

15. The home-network router of claim 11, wherein the processor is configured with processor-executable instructions to perform operations such that:
operation of application logic of the user-selected container is initiated by an application orchestration module; and
downloading the user-selected container comprises downloading the user-selected container to an orchestration database, wherein the application orchestration module and the orchestration database are included in the home-network router.

16. The home-network router of claim 11, wherein the processor is configured with processor-executable instructions to perform operations such that the user-selected container includes a home automation application.

17. The home-network router of claim 11, wherein the processor is configured with processor-executable instructions to perform operations such that the user-selected container includes at least one application selected from Pi-hole, Hass.io, or Homebridge.

18. The home-network router of claim 11, wherein the processor is configured with processor-executable instructions to perform operations further comprising:
receiving, at the home-network router from the remote computing device, a message for interacting with the application associated with the user-selected container.

19. The home-network router of claim 18, wherein the processor is configured with processor-executable instructions to perform operations further comprising:
forwarding the message for interacting with the application associated with the user-selected container from the reverse proxy to a third-party remote server in response to receiving the message from the remote computing device, wherein the third-party remote server provides services for the application associated with the user-selected container.

20. The home-network router of claim 11, wherein the processor is configured with processor-executable instructions to perform operations further comprising:
transmitting, from the home-network router to the remote computing device, a notification that the application associated with the user-selected container is deployed.

21. A non-transitory processor-readable storage medium having stored thereon processor-executable instructions configured to cause a processor to perform operations for deploying an application associated with a user-selected container on a home-network router, comprising:
receiving, at a processor of the home-network router from a remote server, container acquisition data including configuration information and rules for downloading the user-selected container in response to a selection of the user-selected container by a remote computing device for installation of a select application on the home-network router from the remote server, wherein the remote computing device is separate from the home-network router;
initiating, by the processor of the home-network router, operation of application logic of the user-selected container for installation of the select application in response to downloading the user-selected container from a remote container registry; and
updating, by the processor of the home-network router, a reverse proxy maintained in the home-network router through application logic, wherein the reverse proxy is configured to forward requests from operation of the user-selected container to one or more remote servers.

22. The non-transitory processor-readable storage medium of claim 21, wherein the processor is configured with processor-executable instructions to perform operations further comprising:
transmitting, by the home-network router to the remote container registry, a container download request in response to receiving the container acquisition data.

23. The non-transitory processor-readable storage medium of claim 21, wherein the processor is configured with processor-executable instructions to perform operations further comprising:
downloading, by the home-network router from the remote container registry, the user-selected container using the rules for downloading the user-selected container in response to transmitting a container download request to the remote container registry.

24. The non-transitory processor-readable storage medium of claim 21, wherein the processor is configured with processor-executable instructions to perform operations such that updating the reverse proxy comprises updating at least one of a DNS configuration, firewall rule, or hostname configuration to support the application associated with the user-selected container.

25. The non-transitory processor-readable storage medium of claim 21, wherein the processor is configured with processor-executable instructions to perform operations such that:
operation of application logic of the user-selected container is initiated by an application orchestration module; and
downloading the user-selected container comprises downloading the user-selected container to an orchestration database, wherein the application orchestration module and the orchestration database are included in the home-network router.

26. The non-transitory processor-readable storage medium of claim 21, wherein the processor is configured with processor-executable instructions to perform operations such that the user-selected container includes a home automation application.

27. The non-transitory processor-readable storage medium of claim 21, wherein the processor is configured with processor-executable instructions to perform operations such that the user-selected container includes at least one application selected from Pi-hole, Hass.io, or Homebridge.

28. The non-transitory processor-readable storage medium of claim 21, wherein the processor is configured with processor-executable instructions to perform operations further comprising:
receiving, at the home-network router from the remote computing device, a message for interacting with the application associated with the user-selected container.

29. The non-transitory processor-readable storage medium of claim 28, wherein the processor is configured with processor-executable instructions to perform operations further comprising:
forwarding the message for interacting with the application associated with the user-selected container from the reverse proxy to a third-party remote server in response to receiving the message from the remote computing device, wherein the third-party remote server provides services for the application associated with the user-selected container.

30. The non-transitory processor-readable storage medium of claim 28, wherein the processor is configured with processor-executable instructions to perform operations further comprising:
transmitting, from the home-network router to a remote computing device, a notification that the application associated with the user-selected container is deployed.

* * * * *